United States Patent [19]
Chien

[11] Patent Number: 5,337,485
[45] Date of Patent: Aug. 16, 1994

[54] ROUNDNESS ERROR AND CROWN ELECTRONIC MEASURING SYSTEM

[76] Inventor: An Y. Chien, 169 Dwight St. Apt. A, New Haven, Conn. 06511

[21] Appl. No.: 969,651

[22] Filed: Sep. 21, 1992

Related U.S. Application Data

[63] Continuation-in-part of Ser. No. 826,607, Jan. 28, 1992, abandoned.

[51] Int. Cl.$^5$ ............................................. G01B 5/20
[52] U.S. Cl. ........................................ 33/550; 33/555
[58] Field of Search ............... 33/550, 549, 551, 552, 33/554, 555, 555.1, 555.3

[56] References Cited

U.S. PATENT DOCUMENTS

| | | | |
|---|---|---|---|
| 2,391,020 | 12/1945 | Jackman | 33/555.1 |
| 2,603,043 | 7/1952 | Bentemps | 33/555.3 |
| 3,479,744 | 11/1969 | Howland et al. | 33/551 |
| 4,596,076 | 6/1986 | Sigg | 33/555 |
| 4,903,413 | 2/1990 | Bellwood | 33/551 |
| 5,077,908 | 1/1992 | Moore | 33/550 |
| 5,088,207 | 2/1992 | Betsill et al. | 33/555.3 |

Primary Examiner—Christopher W. Fulton

[57] ABSTRACT

An electronic three-probe measuring system with both compact structure, light and small, and spacial method, which views the dimensional changes in the measuring roundness error step to contain both roundness error and vibration for accurately measuring roundness error, concentricity, crown, shape, taper, sag and vibration of cylindrical rolls used in flat rolled product mills.

9 Claims, 7 Drawing Sheets

ROUNDNESS ERROR AND CROWN ELECTRONIC MEASURING SYSTEM

This application is a continuation-in-part of U.S. Ser. No. 07/826,607 filed Jan. 28, 1992, now abandoned.

REFERENCES CITED

| References Cited | | | |
|---|---|---|---|
| U.S. Patent Documents | | | |
| 2,365,353 | 12/44 | Morris | 33/555.1 |
| 2,603,043 | 7/52 | Bontemps | 33/555.3 |
| 3,169,323 | 2/65 | Hold | 33/555.3 |
| 3,942,253 | 3/76 | Gebel et al. | 33/551 |
| 4,389,788 | 6/83 | Balogh et al. | 33/555.1 |
| 4,596,076 | 6/86 | Sigg | 33/555 |
| 4,811,524 | 3/89 | Corallo | 33/783 |
| 5,077,908 | 1/92 | Moore | 33/550 |
| 8,088,207 | 2/92 | Betsill et al. | 33/555.3 |
| Foreign Patent Documents | | | |
| 0647674 | 7/37 | German | 33/555.1 |
| 0003779 | 1/77 | Japan | 33/555.1 |

OTHER PUBLICATIONS

FMT Equipment brochure (attached)(date unknown).

Roll Cal brochure (attached)(date unknown).

"An Introduction to Random Vibrations and Spectrum Analysis", Longmans, London, United Kingdom, 1975, by D. E. Newland

1. Technical Field of the Invention

This invention has its most important application to measure accurately the roundness error, concentricity, crown, shape, taper, sag, and vibrational amplitudes and frequencies in two directions of cylindrical rolls used in flat rolled product mills.

2. Background of the Invention

The roundness error of a roll contains waves of both even order (for example: second, fourth, and any even number) and odd order (for examples: first, third, and any odd number) components. The current roll roundness error and crown measuring systems, with the probes set on a straight line. The other one has three contact points against the roll; out of the three points, only one serves for the measuring probe, which is on a straight line with another contact point. The third contact point is in the middle of the measuring frame for supporting purpose. All the above-mentioned measuring systems can not measure any odd waviness component of roundness error. They have to be mounted on the machine.

This invention submits a method and device which can measure roundness error of both even and odd order waves, plus concentricity, shape, crown, taper, sag, and vibrational amplitudes and frequencies in two directions of cylindrical rolls. The device is compact and light. It can be held on the machine by a medium magnetic stand in operation. No requirement of mounting is necessary unless customers ask for it.

SUMMARY OF THE INVENTION

Roundness Error and Crown Electronic Measuring System described herein utilizes three electronic dimensional gauges (abbreviated "gauges" thereafter), arranged in the same section of the measured roll, plus two encoders. One encoder measures the rotation of the roll. And another encoder measures the roll's axial distance.

The arranged gauges should meet the following conditions: (a) In measuring process, all gauges aim at the center of the roll in accordance with operating principle, remain stationary, and record the dimensional changes of the measured points. (b) No combination of any two of the three probes composes a straight line, or an angle of one hundred eighty degrees. (c) Two probes are separately held on two straight rulers. It is easy for three gauges adjusting within a limited space to accommodate a wide range of roll's sizes.

In the step of measuring roundness error, the measured dimensional changes of the roll are considered to be caused by both the roundness error and the vibration of the roll. A processing procedure of the readings of gauges will give the results of both roundness profile and vibrational measurement.

In the step of measuring shape and sag, the measured dimensional changes are considered to contain both the shaping function and the center's positioning function of the roll along the axial distance. A processing procedure of the readings of gauges will give the results of both sag, and shape which includes crown and taper.

DESCRIPTION OF EXEMPLARY FORMS OF THE INVENTION

Shown in the Drawings

Figure 1:
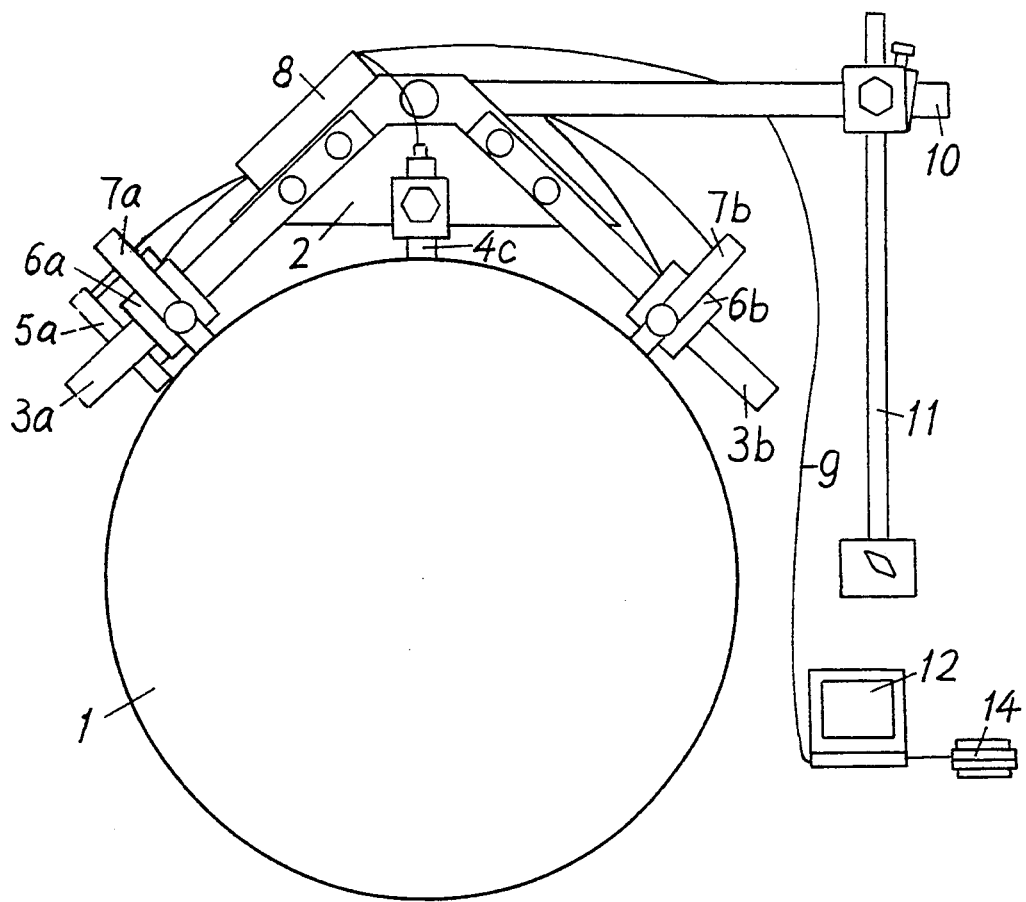
FIG. 1 is a schematic elevation of a device embodying this invention applied to a roll body shown in section.
Figure 2:
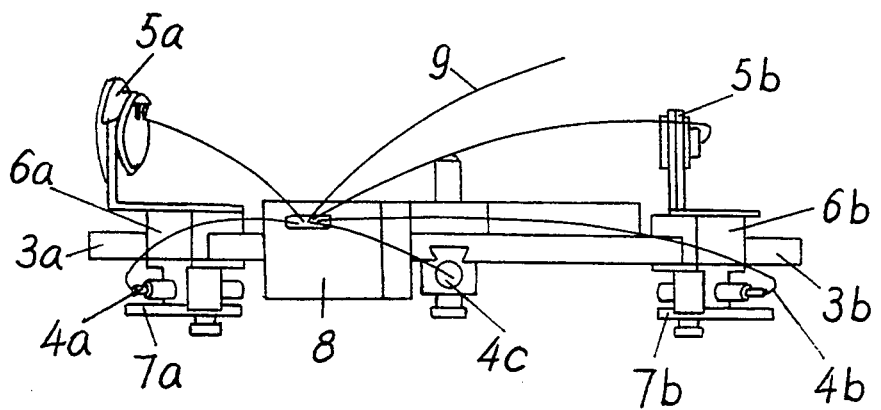
FIG. 2 is a partially top view of the device shown in FIG. 1.

As shown in FIG. 1 and FIG. 2, the preferred form of the inventive device comprises frame 2, together with two straight rulers 3(a), and 3(b). Rulers 3(a) and 3(b) compose an angle, not a straight line. 3(a) holds an electronic dimensional gauge 4(a) by vernier 6(a). And 3(b) holds another gauge 4(b) by vernier 6(b). The head of either of the two gauges is perpendicular to the bottom surface of the corresponding ruler. Because it demands gauges to aim at the center of the roll, either 4(a) or 4(b) should be held at the position of the ruler, where the distance between the ruler and the roll is shortest. Gauge 4(c) is directly held by frame 2, and it is adjusted to the channel of frame 2 to keep a correct measuring position with the roll.

To help the said invention quickly fit properly on the roll, two fitting plates 7(a) and 7(b) are separately mounted on two verniers 6(a) and 6(b). The fitting plates are in contact with roll only in setting up stage, and they will be moved away before the reading process of gauges begins.

Figure 4:
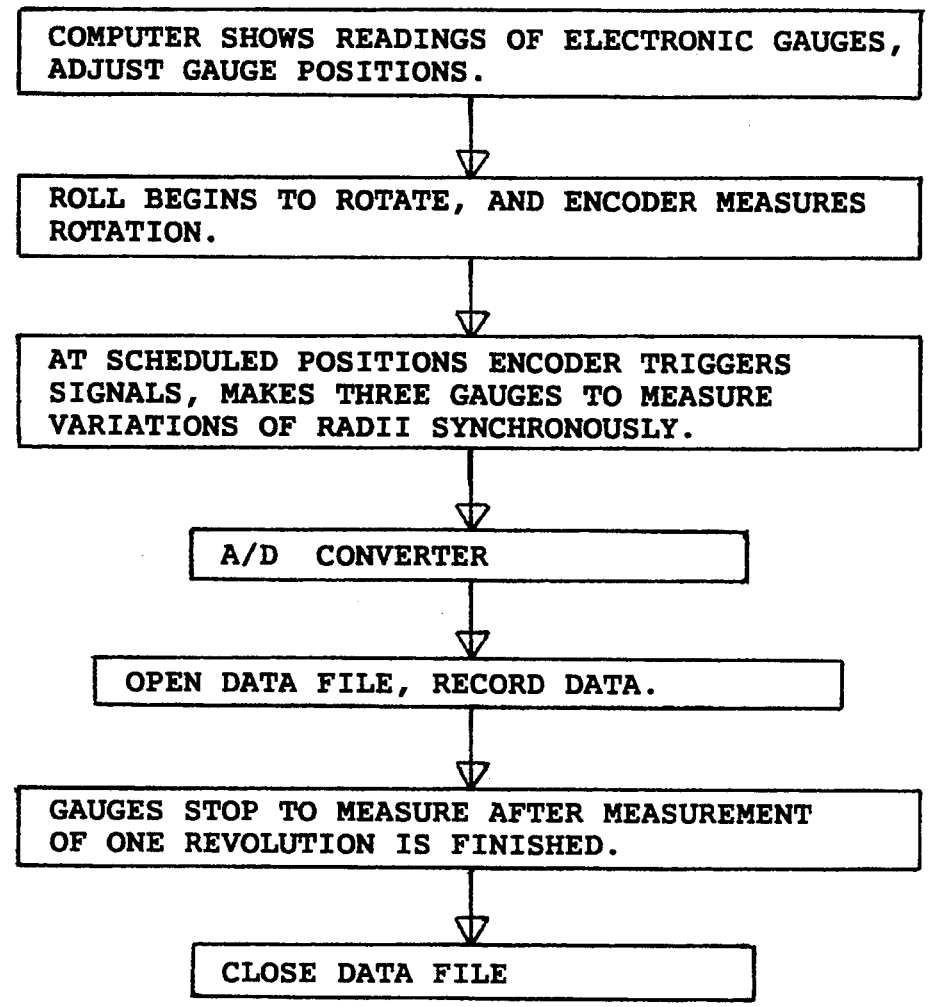
FIG. 4 is a block diagram of a technique for controlling readings of gauges in the process of measuring roundness error in accordance with the invention.
Figure 5:
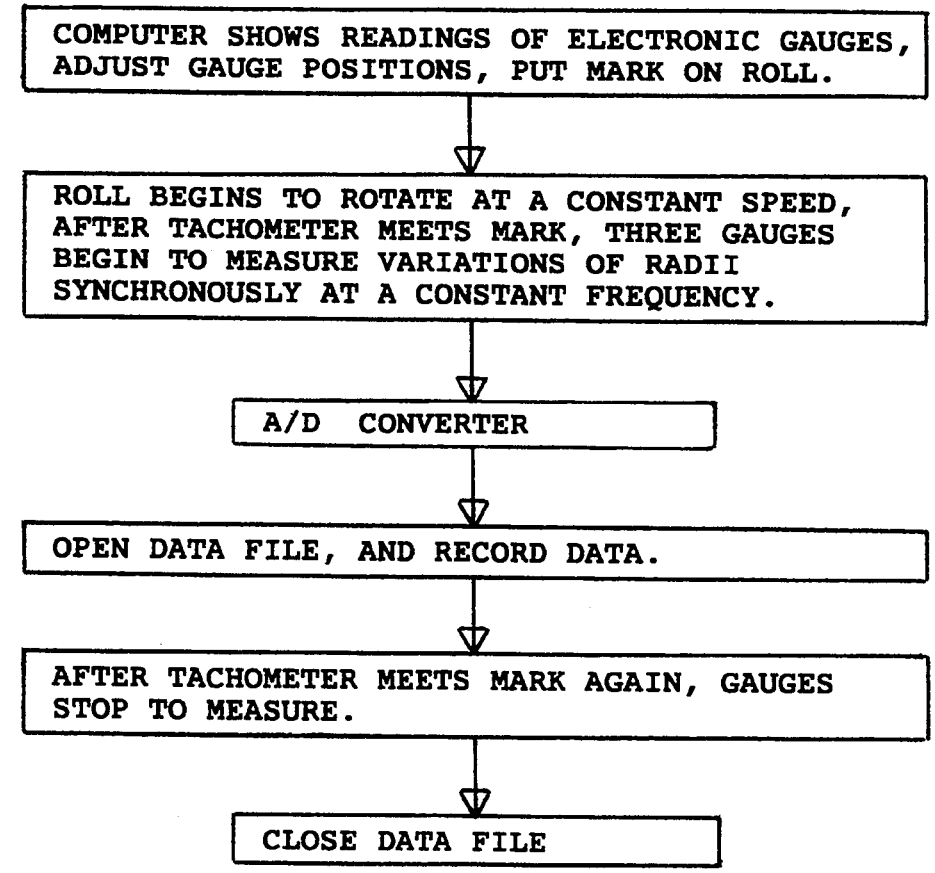
FIG. 5 is a block diagram of an alternate technique for use in FIG. 4.
Figure 8:
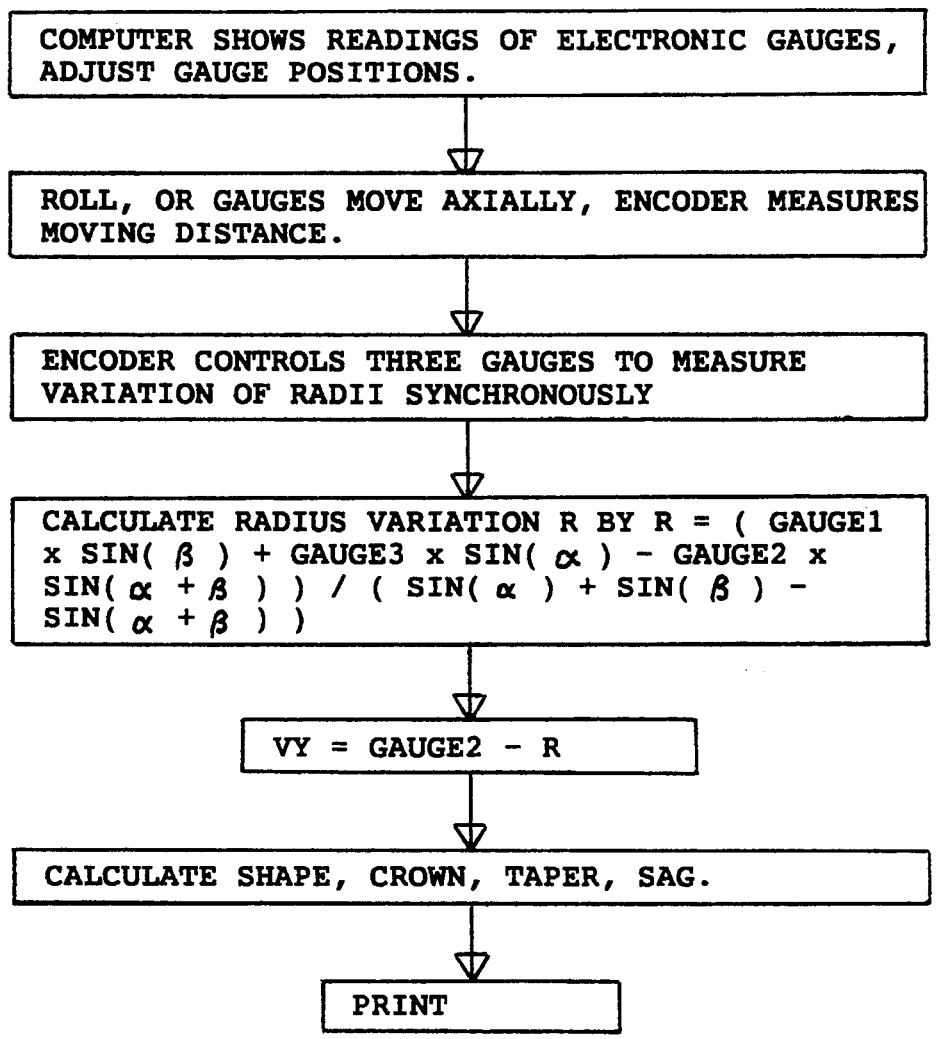
FIG. 8 is a block diagram of a technique for controlling readings of gauges, and calculating the diametric change and vertical displacement function VY in the process of measuring shape which includes crown and taper, and sag.

There are two shaft encoders 5(a) and 5(b) to be mounted to verniers 6(a) and 6(b) respectively. They can be adjusted to the rulers together with verniers to accommodate different sizes of rolls. Encoder 5(b) measures the rotation of the roll when roundness error, concentricity, or vibration of the roll is concerned. FIG. 4 shows a technique for how to use encoder 5(b) to control readings of gauges. Encoder 5(b) may be replaced by a tachometer as shown in FIG. 2. The alternate technique of controlling readings of gauges by a tachometer is shown in FIG. 5. Another encoder 5(a) is to measure the axial distance of the roll when shape which includes crown and taper, and sag of the roll are concerned. FIG. 8 shows a technique of measuring shape and sag. More detailed explanation will be given later.

Interface board 8, connected electronically with all gauges and encoders, gives digital signals to microcomputer 12 by wire 9. The measured results will be plotted by printer 14.

The measurement is usually operated on a grinder or some other machine. The machine makes the roll to rotate in the process of measuring roundness error. When the roll rotates, gauges remain stationary, and record dimensional changes of the measured spots. In the process of measuring crown, one machine makes the roll to move axially, and an other makes gauges to move axially. In either case, gauges record dimensional changes of measured positions. Compared with the currently electronic measuring systems, the said device is small and light. A medium magnetic stand would be strong enough to hold the said device on the machine. Thus, demand for mounting the said device on the machine is not at all necessary unless customers ask for it.

Figure 3:
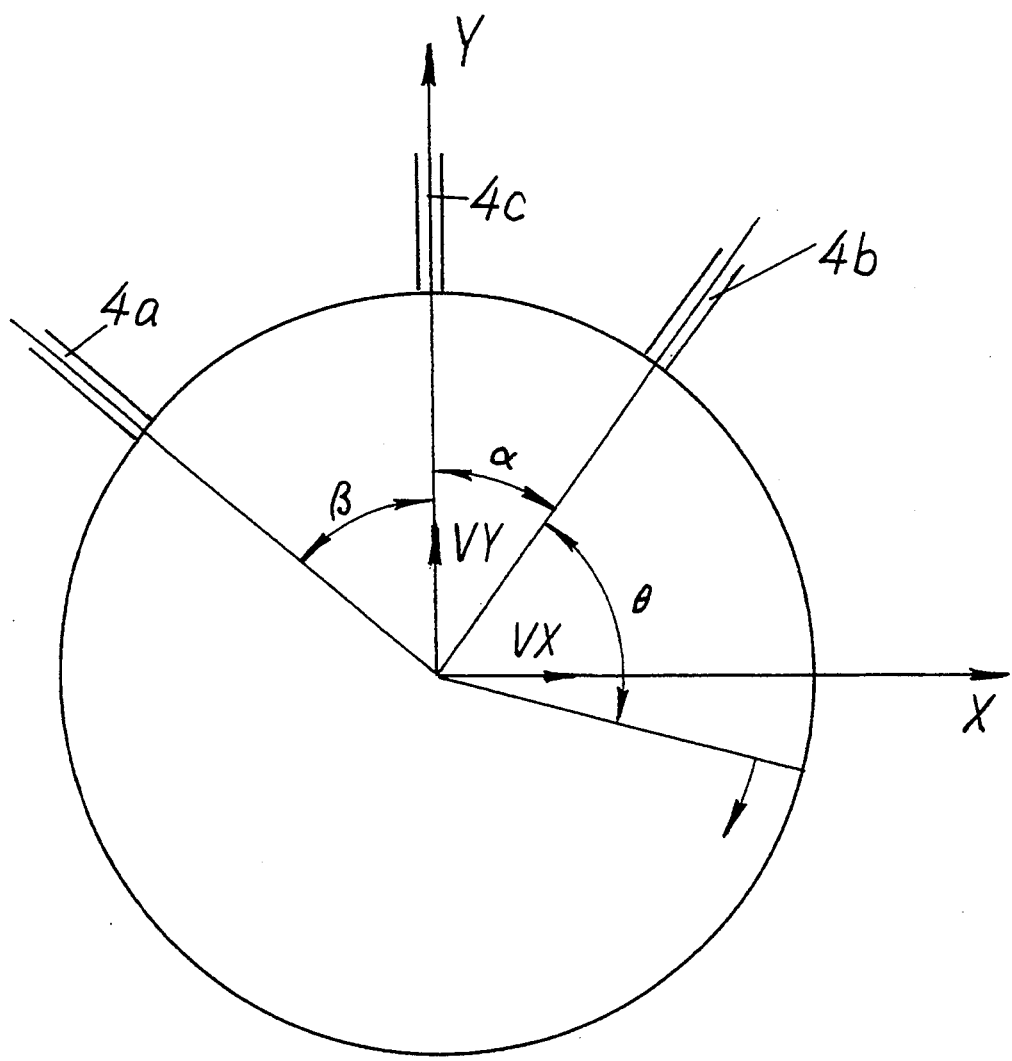
FIG. 3 is a diagram illustrating the geometry of the arrangement.

FIG. 3 shows the geometry between the roll and the said device. When the roll rotates, the roll will vibrate. The vibration is measured by VX and VY. VX stands for the displaced component of the center of the roll in the direction of X-axis. And VY stands for the displaced component in the direction of Y-axis. Gauge 4(c), also labeled as gauge 4c in FIG. 3 is located in Y-axis, a vertical position. To put one gauge in vertical position is an option, not a necessity in measuring roundness error. Let $R(\Theta)$ stand for the roundness profile to be measured. The following equations are easily set up:

$$\text{gauge } 4b(\Theta) = R(\Theta) + \cos(\alpha)*VY(\Theta) + \sin(\alpha)*VX(\Theta) \quad (1)$$

$$\text{gauge } 4c(\Theta) = R(\Theta + \alpha) + VY(\Theta) \quad (2)$$

$$\text{gauge } 4a(\Theta) = R(\Theta + \alpha + \beta) + \cos(\beta)*VY(\Theta) - \sin(\beta)*VX(\Theta) \quad (3)$$

where $\Theta$ stands for the angle of the rotational position of the measured roll; $\alpha$ stands for the angle between gauge 4b and gauge 4c; $\beta$ stands for the angle between Gauge 2 and gauge 4a; gauge 4b, gauge 4c, and gauge 4a stand for the readings of Gauge 1, gauge 4c, and gauge 4a respectively.

It is easy to eliminate VX and VY from Equations (1)–(3), and get the following relation:

$$F(R(\Theta)) = f(\text{Gauge}(\Theta)) \quad (4)$$

where $$f(\text{Gauge}(\Theta)) = \text{Gauge } 1(\Theta) - \sin(\alpha+\beta)*\text{Gauge } 2(\Theta)/\sin(\beta) + \sin(\alpha)*\text{gauge } 4a(\Theta)/\sin(\beta) \quad (5)$$

and $$F(R(\Theta)) = R(\Theta) - \sin(\alpha+\beta)*R(\Theta+\alpha)/\sin(\beta) + \sin(\alpha)*R(\Theta+\alpha+\beta)/\sin(\beta) \quad (6)$$

Equation (5) shows that $f(\text{Gauge}(\Theta))$ is a linearly weighted combination of three readings of gauges. Equation (6) shows that $F(R(\Theta))$ is a weighted combination of three roundness error profiles of $R(\Theta)$, which relatively carry phase delays between any two of them.

Figure 6:
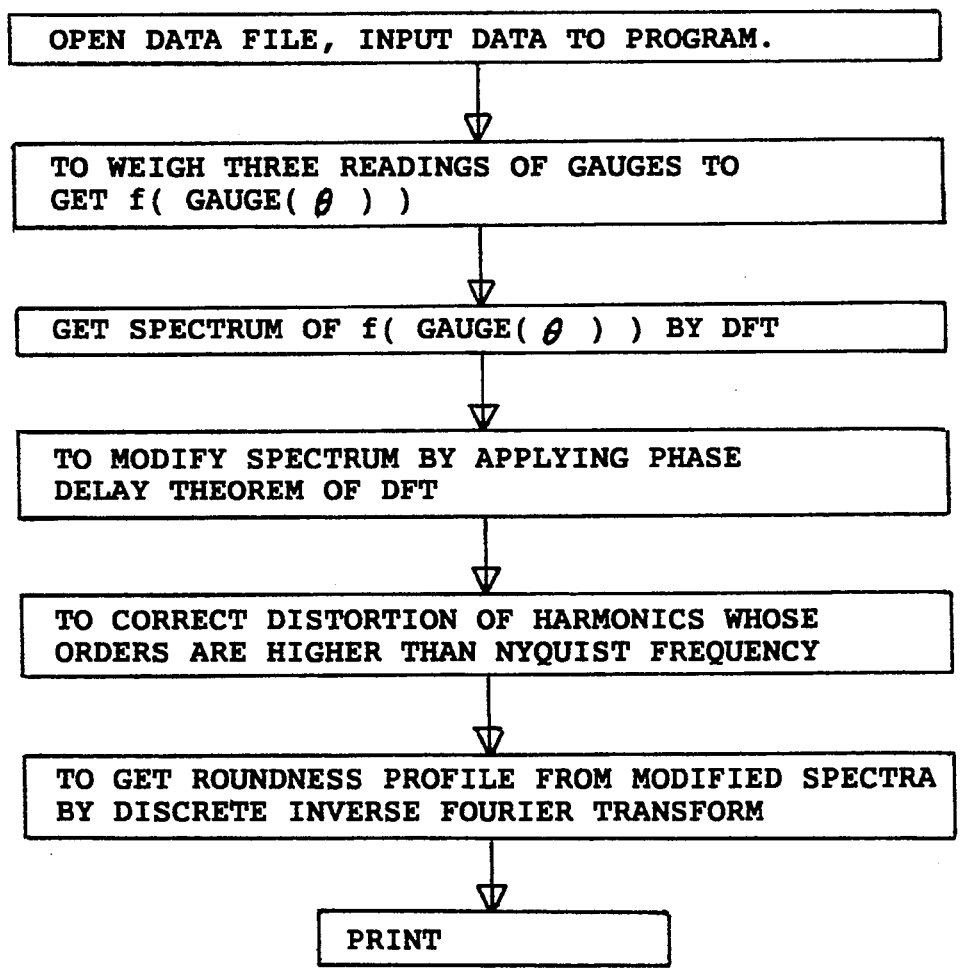
FIG. 6 is a block diagram of a technique for calculating roundness profile.

There are several mathematical methods to solve Equation (4). FIG. 6 shows a technique of solving Equation (4) by the Discrete Fourier Transform (DFT).

After the data file is opened, $f(\text{Gauge}(\Theta))$ is obtained from weighted three readings of gauges. Then, the frequency analysis of $f(\text{Gauge}(\Theta))$ is taken. The phase delay theorem of DFT should be applied in solving left side of Equation (4). After the phase delay is fully considered in DFT, the partial spectrum of $R(\Theta)$ for harmonics whose orders are higher than Nyquist frequency is distorted. A step is taken to correct the distortion of harmonics. This step is to make sure that the spectrum of $R(\Theta)$ is obeying the theorem of DFT of the spectrum relation between harmonics whose orders are lower, and that whose orders are higher than Nyquist frequency. The roundness profile $R(\Theta)$ will accurately be calculated by Discrete Inverse Fourier Transform from the modified spectrum.

Figure 7:
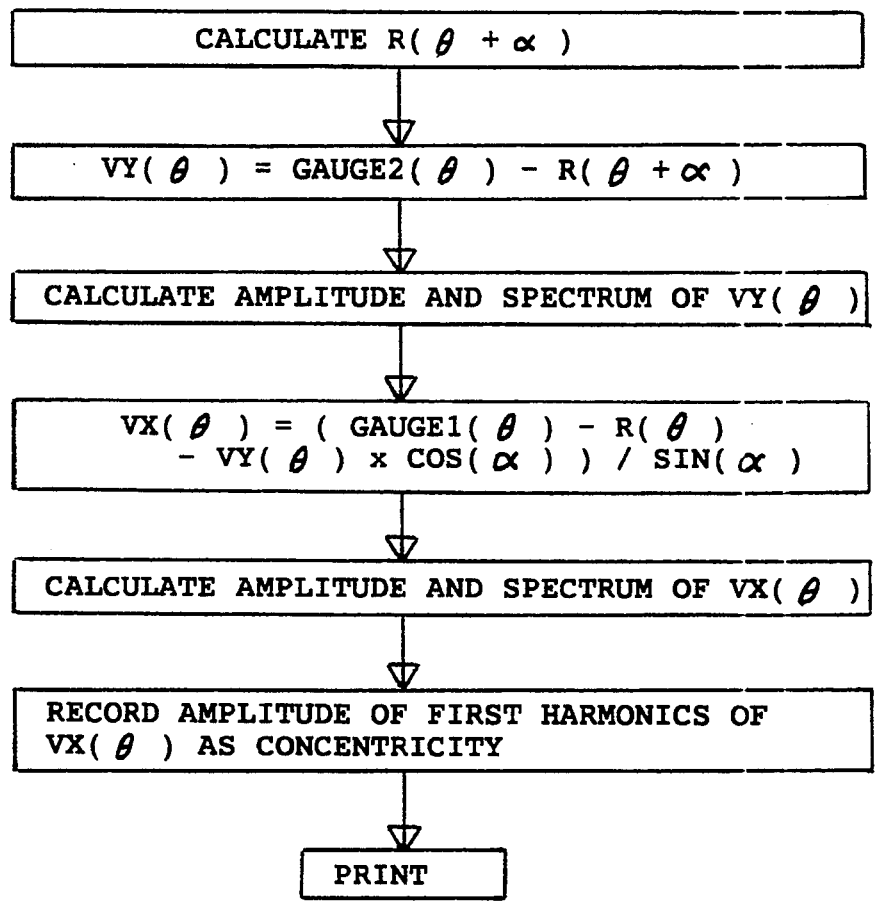
FIG. 7 is a block diagram of a technique for vibrational measurement and frequency analysis in two directions, and for calculating concentricity.

FIG. 7 shows the procedure of vibrational measurement and analysis. $VY(\Theta)$ is easily obtained from Equation (2). $VX(\Theta)$ is obtained from Equation (1). The total vibration amplitude in Y-axis is the difference between the maximum and the minimum of $VY(\Theta)$. Similarly, the total vibration amplitude in X-axis is the difference between the maximum and the minimum of $VX(\Theta)$. By applying DFT method, spectra of both $VX(\Theta)$ and $VY(\Theta)$ will be found. The concentricity of the measured roll should be the double of the amplitude of the first order harmonics of the spectrum of either $VX(\Theta)$ or $VY(\Theta)$.

FIG. 8 shows a technique of measuring shape which includes crown and taper, and sag. The readings of all gauges controlled by an encoder, should be taken synchronously. For measuring sag, one gauge, as gauge 4c in FIG. 3, should be located in the vertical position. Here, VY, VX have been given different meanings. Let VY stand for the Y-axis component, and VX stand for the X-axis component of the positioning change between the center of the roll and the said device during the relatively axial movement in the measurement. The radial change R, which describes the shape of the measured roll is just a weighing procedure of three readings of gauges. The values of VY is calculated from value R and readings of gauge 4c. The mathematical formula for calculating R and VY are shown in FIG. 8. The sag will be obtained by modifying VY function as the following: To make the values of both ends of the measured roll to be equal in VY, the modified other values of VY describe the sag function of the measured roll along its axis.

I claim:

1. A roundness error and crown electronic measuring system for measuring roundness error, concentricity, crown, shape, taper, sag, and vibration in two directions of objects particularly rolls used in flat rolled product mills, comprising:
   a. a frame connected with two straight rulers composing an angle;
   b. two sliding verniers with each adjusted to one ruler;
   c. three electronic dimensional gauges, with two gauges held respectively one by each vernier, and the third one adjusted to the channel of the frame; every said gauge having its own axis directed at the center of the object to comply with the operating principals; any pair of said axes not composing an angle of 180 degrees;
   d. two adjustable fitting plates, one on each of said verniers to help adjust the position of the said gauges on the verniers on the object, to be removed at the beginning of gauging;
   e. two encoders one on each of said verniers with one measuring the rotation of the object, and the other one measuring the distance along the length of the object;
   f. an interface board, electronically connecting said gauges and said encoders to a microcomputer with means for converting analog signals from said gauges to digital output;
   g. a power supply connected to said microcomputer.

2. A roundness error, vibration, and concentricity measuring method comprising steps of:
   synchronously measuring variations of radii at three different points within one circumference while the object rotates;
   viewing that the variations of radii were caused by both the roundness error and the vibration or displacement of the center of the object to be measured;
   processing the measured data, and calculating the roundness profile of the measured object.

3. The method as claimed in claim 2 wherein the said step of calculating the roundness profile further including the steps of:
   weighing three reading functions into one function;
   applying phase delay theorem of the Discrete Fourier Transform (DFT);
   calculating the roundness profile by the Discrete Inverse Fourier Transform.

4. The method as claimed in claim 3 wherein said applying phase delay theorem of the Discrete Fourier Transform, further includes the step of correcting the distortion of part of the spectrum for the harmonics whose orders are higher than the Nyquist frequency by the spectrum relation theorem of the Discrete Fourier Transform.

5. The method as claimed in claim 2 further considering vibrational measurement and including steps of:
   process of calculating displacement components in both x-axis and y-axis of the center of the object to be measured in the process of rotation;
   calculating total vibrational amplitudes in both x-axis and y-axis.

6. The method as claimed in claim 5 further includes the step of vibrational analysis of amplitudes versus frequencies of the said two displacement components.

7. The method as claimed in claim 2 considering concentricity, further includes the step of calculating the double of the amplitude of the first harmonics of the spectrum of either of the said two displacement components as concentricity of the object to be measured.

8. A measuring method of shape which includes crown and taper, comprising steps of:
   synchronously measuring variations of radii at three different points within one circumference while there is a relative axial movement between the said gauges and the object to be measured;
   calculating radial variation R by weighing three readings;
   calculating crown, and taper.

9. The method as claimed in claim 8 considering requirement of measuring sag, further including steps of:
   synchronously measuring variations of radii in one circumference at three different points, among them one being in vertical position, while there is a relative axial movement between the said gauges and the object to be measured;
   calculating the vertical variation VY, and modifying VY after radial variation R is calculated.

* * * * *